United States Patent
Song et al.

(10) Patent No.: US 12,276,322 B2
(45) Date of Patent: Apr. 15, 2025

(54) ELECTROMECHANICAL ACTUATOR AND METHOD FOR FORCED UNLOCKING OF FUZZY JAMMING FAULT OF TRANSMISSION MECHANISM

(71) Applicant: BEIJING INSTITUTE OF PRECISION MECHATRONICS AND CONTROLS, Beijing (CN)

(72) Inventors: Hongzhou Song, Beijing (CN); Zhiyuan Yu, Beijing (CN); Shoujun Zhao, Beijing (CN); Zheqing Zuo, Beijing (CN); Zhe Zhao, Beijing (CN); Bo Zeng, Beijing (CN); Zonglun Li, Beijing (CN); Haiping Zhou, Beijing (CN); Xiaorong Zhu, Beijing (CN); Yecheng Yin, Beijing (CN); Zixing Wang, Beijing (CN)

(73) Assignee: Beijing Institute of Precision Mechatronics and Controls, Beijing (CN)

( * ) Notice: Subject to any disclaimer, the term of this patent is extended or adjusted under 35 U.S.C. 154(b) by 0 days.

(21) Appl. No.: 18/038,167

(22) PCT Filed: Sep. 10, 2021

(86) PCT No.: PCT/CN2021/117739
§ 371 (c)(1),
(2) Date: May 22, 2023

(87) PCT Pub. No.: WO2023/284102
PCT Pub. Date: Jan. 19, 2023

(65) Prior Publication Data
US 2023/0407953 A1 Dec. 21, 2023

(30) Foreign Application Priority Data
Jul. 16, 2021 (CN) .................. 202110808088.X

(51) Int. Cl.
*F16H 25/24* (2006.01)
*H02K 7/06* (2006.01)
*F16H 25/20* (2006.01)

(52) U.S. Cl.
CPC .......... *F16H 25/2454* (2013.01); *H02K 7/06* (2013.01); *F16H 2025/2075* (2013.01)

(58) Field of Classification Search
CPC ........ F16H 25/2454; F16H 2025/2075; H02K 7/06
See application file for complete search history.

(56) References Cited

U.S. PATENT DOCUMENTS

| | | | | |
|---|---|---|---|---|
| 4,745,815 A | * | 5/1988 | Klopfenstein | .......... B64C 13/38 74/89.25 |
| 8,686,603 B2 | * | 4/2014 | Aso | ........................ H02K 7/083 310/80 |
| 2006/0266146 A1 | | 11/2006 | Waide | |

FOREIGN PATENT DOCUMENTS

| | | |
|---|---|---|
| CN | 103545977 A | 1/2014 |
| CN | 103840601 A | 6/2014 |

(Continued)

*Primary Examiner* — Charles A Fox
*Assistant Examiner* — Gregory T Prather
(74) *Attorney, Agent, or Firm* — Boyle Fredrickson, S.C.

(57) ABSTRACT

An electromechanical actuator for forced unlocking of a fuzzy jamming fault of a transmission mechanism comprises a bidirectional electromagnetic braking assembly, a circumferential rotating housing assembly, an axial spline bearing assembly, an LVDT linear displacement sensor assembly, a potentiometer linear displacement sensor assembly, and an electromechanical actuator assembly. The axial spline bearing assembly is mounted inside the circumferential rotating housing assembly for a reciprocating linear motion, and the axial spline bearing assembly is connected to an output rotating shaft of the electromechanical actuator assembly to form a spiral transmission pair; the bidirectional electro- (Continued)

magnetic braking assembly is actively energized to generate radial and axial attraction forces, so that the circumferential rotating housing assembly is disengaged from a fixed connection with the electromechanical actuator assembly to rotate.

13 Claims, 4 Drawing Sheets

(56) References Cited

FOREIGN PATENT DOCUMENTS

| | | |
|---|---|---|
| CN | 107612205 A | 1/2018 |
| CN | 107725705 A | 2/2018 |
| CN | 112460220 A | 3/2021 |
| CN | 112539118 A | 3/2021 |
| CN | 112636528 A | 4/2021 |

* cited by examiner

ELECTROMECHANICAL ACTUATOR AND METHOD FOR FORCED UNLOCKING OF FUZZY JAMMING FAULT OF TRANSMISSION MECHANISM

CROSS-REFERENCE TO RELATED APPLICATIONS

This disclosure is a national phase application of PCT international patent application PCT/CN2021/117739, filed on Sep. 10, 2021 which claims the benefit of the priority to Chinese Patent Disclosure No. 202110808088.X, titled "ELECTROMECHANICAL ACTUATOR AND METHOD FOR FORCED UNLOCKING OF FUZZY JAMMING FAULT OF TRANSMISSION MECHANISM", filed with the China National Intellectual Property Administration on Jul. 16, 2021, which are incorporated herein by reference in its entirety.

TECHNICAL FIELD

The present disclosure relates to an electromechanical actuator, and in particular to an electromechanical actuator for forcibly unlocking fuzzy jam fault of a transmission mechanism.

BACKGROUND OF THE INVENTION

In the conventional electromechanical actuator, a ball screw or a roller screw is an important transmission mechanism that converts the rotary motion of a motor into the linear motion, with the characteristics of high efficiency and high precision. In the conventional disclosure field, the conventional failure forms of the transmission mechanism mainly include: fracture, reduced efficiency, mismatch between rotation and linear expansion distance, unstable lead, etc. However, the ball screw in aerospace field generally has the characteristics of high speed, high frequency and high overload. Under the specific use condition in aerospace field, the failure forms of the transmission mechanism are different from that in the conventional disclosure field, and jam and lag of the ball or the roller are the typical failure forms in the aerospace field.

From the perspective of patents at China and foreign countries, the principle of the linear electromechanical actuator to remove a jam fault or a lag fault is mostly based on redundancy design considerations, in which two sets of ball screw pairs or roller screw pairs are used, resulting in significant increase in the weight and volume of the mechanism and serious decrease in power density. The existing technical solution for unlocking the jam of the transmission mechanism is that only when the lead screw pair is completely stuck, the servo motor can transfer torque to the housing by using a dead point for fault removal. However, the lead screw pair may encounter the problem of "lag and false jam", and the current technical solution cannot work to this fuzzy situation.

SUMMARY OF THE INVENTION

The technical problem solved by the present disclosure is that: an electromechanical actuator for forcibly unlocking fuzzy jamming fault of a transmission mechanism is provided, which overcomes the disadvantages of the prior art, the greatest advantage of the electromechanical actuator is that the faults not matter "jam" or "lag" can be both forced isolated, and the post-fault safety can be achieved while the volume weight of the electromechanical actuator does not increase.

The technical solution according to the present disclosure is as follows:

an electromechanical actuator for forcibly unlocking fuzzy jamming fault of a transmission mechanism, includes a bidirectional electromagnetic braking assembly, a circumferential rotating housing assembly, an axial spline bearing assembly and an electromechanical actuator assembly;

the electromechanical actuator assembly, the bidirectional electromagnetic braking assembly, the circumferential rotating housing assembly and the axial spline bearing assembly are sequentially arranged on a same axis, the axial spline bearing assembly is mounted inside the circumferential rotating housing assembly so as to provide a linear reciprocation, and the axial spline bearing assembly is connected to an output rotating shaft of the electromechanical actuator assembly to form a screw transmission pair; the bidirectional electromagnetic braking assembly is actively energized to generate a radial attraction force and an axial attraction force simultaneously, so that the circumferential rotating housing assembly is disconnected with the electromechanical actuator assembly from a fixed connection therebetween and makes a rotary motion, to forcibly deactivate a connection between the axial spline bearing assembly and the electromechanical actuator assembly, and forcibly remove a fault of jam fault or a lag fault between a rotor lead screw in the electromechanical actuator assembly and a transmission mechanism of the axial spline bearing assembly.

Furthermore, the bidirectional electromagnetic braking assembly includes an axial magnetic rotor, a floating magnetic stator, an electromagnetic coil stator, a spring, a fixing screw and a magnetic steel ball;

the circumferential rotating housing assembly includes: a circumferential rotating bearing pedestal and an actuator housing;

the axial spline bearing assembly includes an axial spline nut and an axial spline sleeve;

the electromechanical actuator assembly includes a lead screw supporting bearing, the rotor lead screw, a front end cover, a front lug, a servo motor and a rear lug;

the electromagnetic coil stator of the bidirectional electromagnetic braking assembly is fixed on the circumferential rotating bearing pedestal, and the axial magnetic rotor is fixed on the rotor lead screw;

When the bidirectional electromagnetic braking assembly is actively energized, the electromagnetic coil stator axially attracts the floating magnetic stator and the axial magnetic rotor, so that the floating magnetic stator, the axial magnetic rotor and the rotor lead screw are fixedly connected to form a whole; the electromagnetic coil stator radially attracts the magnetic steel ball, and the magnetic steel ball compresses the spring into a groove where the circumferential rotating bearing pedestal is located, so that the circumferential rotating bearing pedestal is disconnected with a housing of the servo motor from a circumferential rotating connection therebetween; the fixing screw limits the magnetic steel ball from being moved outward, and thus the spring is kept in a pre-compressed state.

the axial spline nut and the rotor lead screw are mounted on the same axis, the axial spline nut moves linearly through the screw transmission when the rotor lead screw rotates around the fixed axis; the circumferential rotating bearing pedestal supports the bearing of the rotor lead screw to rotate;

protruding splines are provided at an outer circumference of the axial spline nut and are axially connected with spline grooves on an inner circumference of the axial spline sleeve; the axial spline sleeve and the front lug are threadedly connected to form a whole for being mounted with an external frame; the lead screw supporting bearing, the rotor lead screw, the actuator housing, the front end cover, the front lug, the servo motor and the rear lug are sequentially mounted on the same axis.

Furthermore, a relative rotary motion between the circumferential rotating bearing pedestal and the rotor lead screw is achieved by the lead screw supporting bearing.

Furthermore, the protruding splines provided at a middle section of the outer side surface of the axial spline nut are rectangular splines, multiple rectangular splines at the middle section of the outer side surface of the axial spline nut are meshed with the spline grooves defined on the inner wall of the axial spline sleeve in case that the axial spline nut is normally meshed with the rotor lead screw for transmission, so that the axial spline nut and the axial spline sleeve only make an axial reciprocation.

Furthermore, the rectangular splines on the axial spline nut are disconnected from the spline grooves on the inner side of the axial spline sleeve in case that the axial spline sleeve is driven to rotate by the actuator housing.

Furthermore, in case that the jam fault or the lag fault occurs between the axial spline nut and the rotor lead screw, the bidirectional electromagnetic braking assembly is actively energized for control, the actuator housing drives the axial spline sleeve to rotate by an angle, to forcibly disconnect the axial spline sleeve with the axial spline nut from an axial connection therebetween.

Furthermore, a protruding square block is provided on the outer side of the axial spline nut and reciprocates in a sliding groove of the actuator housing; and a protruding height of the protruding square block is greater than the protruding splines on the outer side of the axial spline nut.

Furthermore, a sector notch is defined on a side surface of the axial spline sleeve, to avoid a geometric interference with the protruding square block on the axial spline nut.

Furthermore, the electromechanical actuator assembly further includes a linear displacement sensor, it is determined that the jam fault, the lag fault, or a looseness fault occurs in case that the linear displacement sensor of the electromechanical actuator assembly feeds back that a rotation of a ball screw pair is inconsistent with a linear displacement distance.

Furthermore, the electromechanical actuator according to the present disclosure further includes an LVDT (Linear Variable Differential Transformer) linear displacement sensor assembly, a potentiometer linear displacement sensor assembly and a control driver.

an absolute position of the axial spline nut is detected by the potentiometer linear displacement sensor, and an absolute position of the axial spline sleeve is detected by the LVDT linear displacement sensor assembly, the control driver sends a recovery control signal to the bidirectional electromagnetic braking assembly when the two linear displacement sensors reach a switching position instantaneously, the bidirectional electromagnetic braking assembly is actively energized to generate the radial attraction force and the axial attraction force simultaneously, and the servo motor makes a rotary motion, so that the circumferential rotating housing assembly is fixedly connected with the electromechanical actuator assembly, to forcibly disconnect the axial spline sleeve from the axial spline nut at a corresponding annular groove, and then the axial spline bearing assembly is connected to perform a linear reciprocation again, and a mechanical transmission function is recovered.

Furthermore, the LVDT linear displacement sensor assembly includes an LVDT stator, an LVDT telescopic rod, an LVDT bracket and an LVDT housing; the potentiometer linear displacement sensor includes a potentiometer spring brush and a potentiometer resistance plate;

the LVDT linear displacement sensor assembly is mounted on an outer side of the actuator housing, the LVDT telescopic rod is coaxial with the LVDT stator and reciprocates in an inner cavity of the LVDT stator, the LVDT telescopic rod and the LVDT bracket are connected by screws, and the LVDT bracket is fixedly connected to a front end of the axial spline sleeve; the LVDT stator is mounted inside the LVDT housing, the LVDT housing is connected to an outer surface of the actuator housing by screws;

the potentiometer spring brush is mounted at a protruding position of the axial spline nut and is in contact with the potentiometer resistance plate to be in a pre-compressed state; and the potentiometer resistance plate is mounted on the outer side of the actuator housing.

Furthermore, a method for forcibly unlocking fuzzy jam fault of a transmission mechanism is provided according to the present disclosure, which includes the following steps step 1, determining that the jam fault, the lag fault, or a looseness fault occurs when a linear displacement sensor of the electromechanical actuator assembly feeds back that a rotation of a ball screw pair is inconsistent with a linear displacement distance;

step 2, attracting the floating magnetic stator and the axial magnetic rotor axially by the electromagnetic coil stator when the bidirectional electromagnetic braking assembly is actively energized, so that the floating magnetic stator, the axial magnetic rotor and the rotor lead screw are fixedly connected to form a whole;

step 3, attracting the magnetic steel ball radially by the electromagnetic coil stator, and compressing the spring into the grooved defined in the circumferential rotating bearing pedestal by the magnetic steel ball, so that the circumferential rotating bearing pedestal is disconnected with the housing of the servo motor from the circumferential rotating connection therebetween;

step 4, driving the axial spline sleeve to rotate by an angle by the actuator housing, to forcibly disconnect the axial spline sleeve with the axial spline nut from an axial connection therebetween, forcibly deactivate the connection of the axial spline bearing assembly, and forcibly remove the jam fault or the lag fault between the rotor lead screw and the transmission mechanism of the axial spline nut, so that the axial spline sleeve and the front lug are in a floating state.

Furthermore, a mechanical fault self-recovery method is provided according to the present disclosure, which includes the following steps:

step 1, collecting a position signal of the axial spline sleeve and a position signal of the axial spline nut simultaneously by the two sensors arranged inside and outside the electromechanical actuator, pushing the two linear displacement sensors to be aligned to a fault contact position by means of a system redundancy design of a servo system in an engine or an air rudder, that is, feedback values of the LVDT linear displacement sensor assembly and the potentiometer linear displacement sensor assembly being consistent within an error range;

step 2, attracting the magnetic steel ball radially by the electromagnetic coil stator, and compressing the spring into the grooved defined in the circumferential rotating bearing pedestal by the magnetic steel ball, so that the circumferential rotating bearing pedestal is disconnected with the housing of the servo motor from the circumferential rotating connection therebetween;

step 3, driving the axial spline sleeve to rotate by an angle by the actuator housing, to forcibly disconnect the axial spline sleeve from the axial spline nut at the corresponding annular groove, so that the axial spline bearing assembly is connected to perform the linear reciprocation again, and the mechanical transmission function is recovered.

Compared with the conventional technology, the present disclosure has the following beneficial effects:

(1) the technical solution of the electromechanical actuator for forcibly unlocking fuzzy jamming fault of the transmission mechanism according to the present disclosure solves the problem of jam or lag of the ball screw of the electromechanical actuator by using the output torque of the servo motor for fault isolation, realizes the safety after the actuator fault, and also realizes the work after fault by using the cooperation of the two linear displacement sensors.

(2) the technical solution of the electromechanical actuator for forcibly unlocking fuzzy jamming fault of the transmission mechanism according to the present disclosure ensures the high power density requirements of the electromechanical actuator, and does not significantly increase weight and volume by using the bidirectional control electromagnetic brake to achieve power switching in two directions.

(3) the technical solution of the electromechanical actuator for forcibly unlocking fuzzy jamming fault of the transmission mechanism according to the present disclosure solves the problem that roller screw or the ball screw may have "lag, false jam", and can forcibly remove and isolate the fault.

(4) the technical solution of the electromechanical actuator for forcibly unlocking fuzzy jamming fault of the transmission mechanism according to the present disclosure forcibly removes the jam and lag point by ingeniously using the characteristics of large torque output of the servo motor and using a common power source, and this idea can be borrowed from other actuators.

(5) the technical solution of the electromechanical actuator for forcibly unlocking fuzzy jamming fault of the transmission mechanism according to the present disclosure can be extended to the technical field of high reliability and high safe actuation technology, such as the main flight control surface of the civil aircraft, the auxiliary flight control surface of the fighter aircraft, the thrust vector control of the engine, the flight control surface of the reusable aircraft for space shuttle, etc., which has a broader disclosure prospect.

DETAILED DESCRIPTION OF THE EMBODIMENTS

The specific embodiments of the present disclosure are described in detail hereinafter in conjunction with the drawings.

In view of the fact that the existing technical solution cannot remove the fuzzy case of "lag or jam", an electromechanical actuator for forcibly unlocking fuzzy jamming fault of a transmission mechanism is provided according to the present disclosure, which includes a bidirectional electromagnetic braking assembly, a circumferential rotating housing assembly, an axial spline bearing assembly and an electromechanical actuator assembly;

the electromechanical actuator assembly, the bidirectional electromagnetic braking assembly, the circumferential rotating housing assembly and the axial spline bearing assembly are sequentially arranged on a same axis, the axial spline bearing assembly is mounted inside the circumferential rotating housing assembly to provide a linear reciprocation, and the axial spline bearing assembly is connected to an output rotating shaft of the electromechanical actuator assembly, which forms a screw transmission pair; the bidirectional electromagnetic braking assembly is actively energized to generate a radial attraction force and an axial attraction force simultaneously, so that the circumferential rotating housing assembly is disconnected with the electromechanical actuator assembly from a fixed connection therebetween and makes a rotary motion, to forcibly deactivate a connection between the axial spline bearing assembly and the electromechanical actuator assembly, and forcibly remove a jam fault or a lag fault between a rotor lead screw in the electromechanical actuator assembly and a transmission mechanism of the axial spline bearing assembly.

Figure 1:
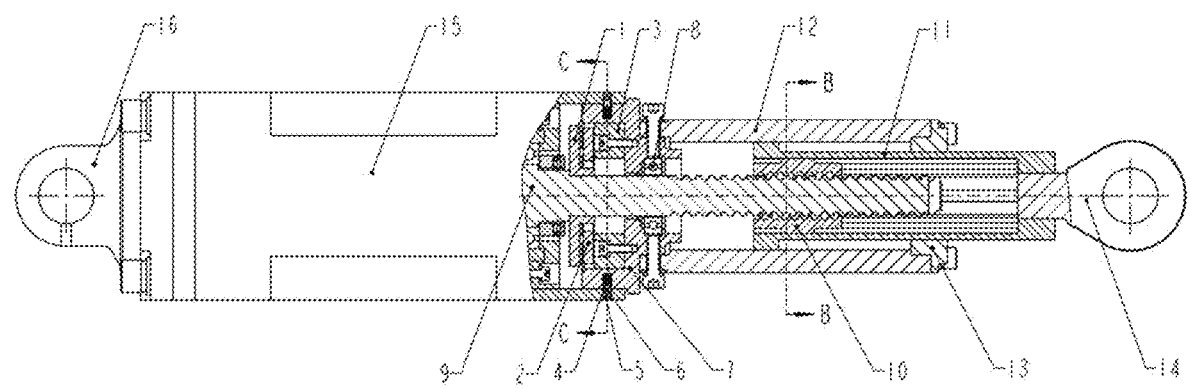
FIG. 1 is a structural view showing an internal composition of a electromechanical actuator for forcibly unlocking fuzzy jamming fault of a transmission mechanism according to a first embodiment of the present disclosure.

As shown in FIG. 1, the bidirectional electromagnetic braking assembly according to the present disclosure includes an axial magnetic rotor 1, a floating magnetic stator 2, an electromagnetic coil stator 3, a spring 4, a fixing screw 5 and a magnetic steel ball 6; the circumferential rotating housing assembly includes: a circumferential rotating bearing pedestal 7 and an actuator housing 12; the axial spline bearing assembly includes an axial spline nut 10 and an axial spline sleeve 11; the electromechanical actuator assembly includes a lead screw supporting bearing 8, the rotor lead screw 9, a front end cover 13, a front lug 14, a servo motor 15 and a rear lug 16.

Figure 2:
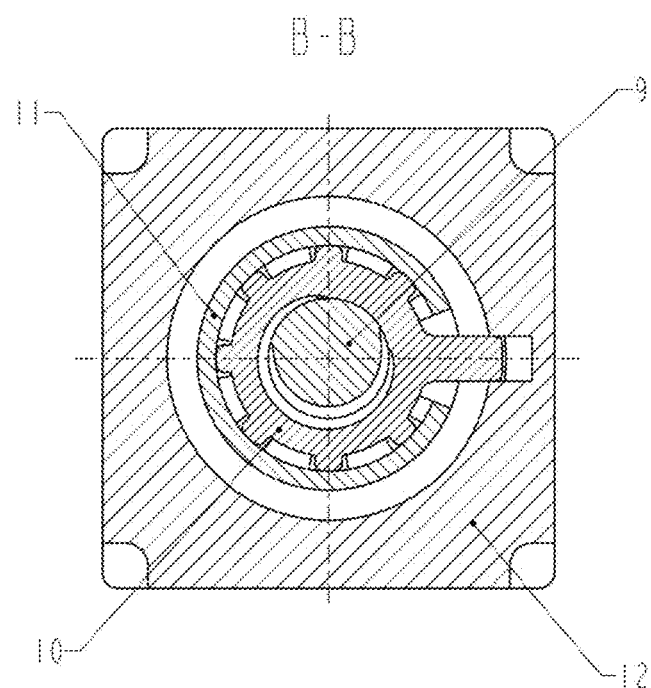
FIG. 2 is an internal cross-sectional view of an axial spline bearing assembly according to the first embodiment of the present disclosure.
Figure 3:
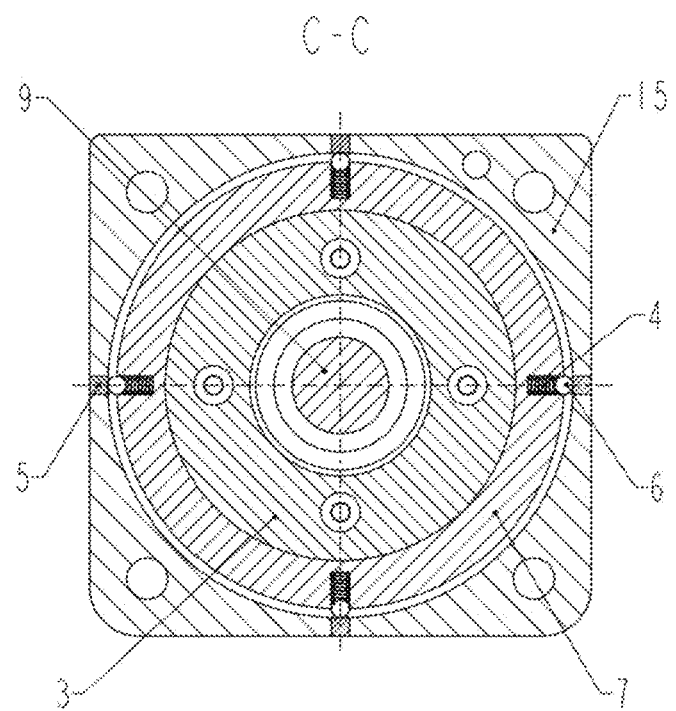
FIG. 3 is an internal cross-sectional view of a bidirectional electromagnetic braking assembly according to the first embodiment of the present disclosure.

The electromagnetic coil stator 3 of the bidirectional electromagnetic braking assembly is fixed on the circumferential rotating bearing pedestal 7, and the axial magnetic rotor 1 is fixed on the rotor lead screw 9;

as shown in FIG. 3, when the bidirectional electromagnetic braking assembly is actively energized for control, the electromagnetic coil stator 3 axially attracts the floating magnetic stator 2 and the axial magnetic rotor 1, so that the floating magnetic stator 2, the axial magnetic rotor 1 and the rotor lead screw 9 are fixedly connected to form a whole; the electromagnetic coil stator 3 radially attracts the magnetic steel ball 6, and the magnetic steel ball 6 compresses the spring 4 into a groove where the circumferential rotating bearing pedestal 7 is located, so that the circumferential rotating bearing pedestal 7 is disconnected with a housing of the servo motor 15 from a circumferential rotating connection therebetween; the fixing screw 5 limits the magnetic steel ball 6 from moving outward so that the spring 4 is always kept in a pre-compressed state;

as shown in FIG. 2, the axial spline nut 10 and the rotor lead screw 9 are mounted on the same axis, and the axial spline nut 10 moves linearly through the screw transmission when the rotor lead screw 9 rotates around the fixed axis; the circumferential rotating bearing pedestal 7 supports the bearing of the rotor lead screw 9 to rotate;

protruding splines are provided in an outer circumference of the axial spline nut 10 and are axially connected with spline grooves on an inner circumference of the axial spline sleeve 11; the axial spline sleeve 11 and the front lug 14 are threadedly connected to form a whole for mounting with an external frame; the lead screw supporting bearing 8, the rotor lead screw 9, the actuator housing 12, the front end cover 13, the front lug 14, the servo motor 15 and the rear lug 16 are sequentially mounted on the same axis.

A relative rotary motion between the circumferential rotating bearing pedestal 7 and the rotor lead screw 9 is achieved by the lead screw supporting bearing 8.

Figure 4:
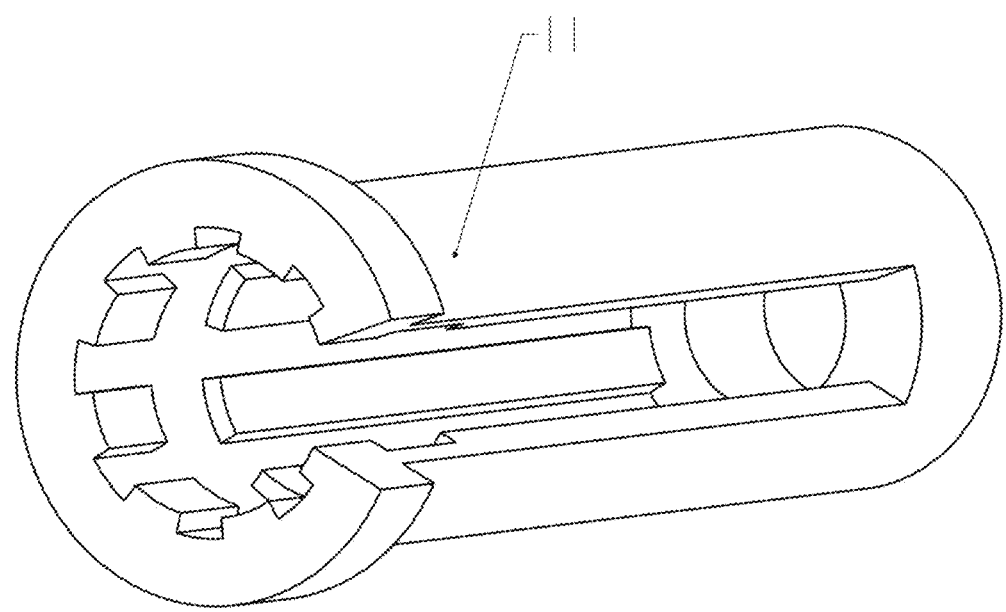
FIG. 4 is a schematic view showing an appearance of an axial spline sleeve according to the present disclosure.
Figure 5:
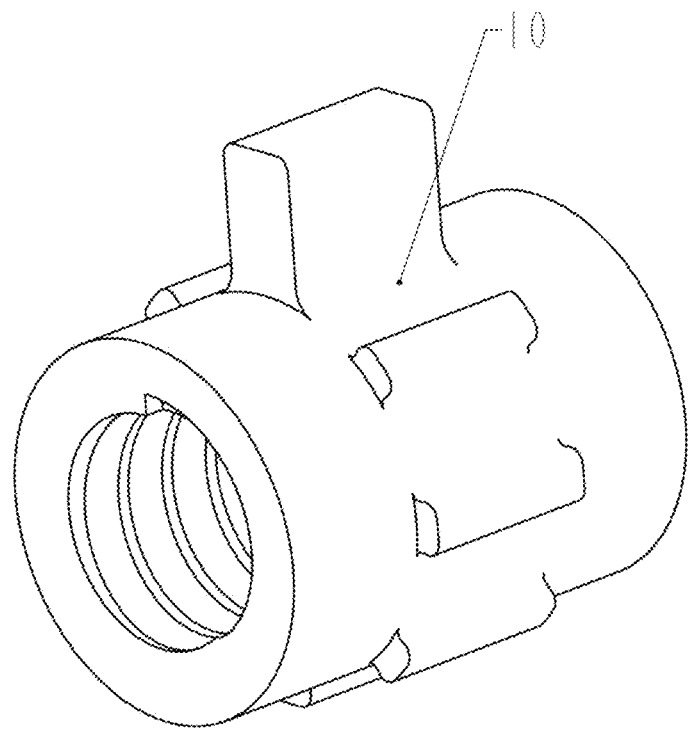
FIG. 5 is a schematic view showing an appearance of an axial spline nut according to the present disclosure.

As shown in FIG. 4 and FIG. 5, the protruding splines provided at a middle section of the outer side surface of the axial spline nut 10 are rectangular splines. When the axial spline nut 10 is normally meshed with the rotor lead screw 9 for transmission, multiple rectangular splines at the middle section of the outer side surface of the axial spline nut 10 are meshed with the spline grooves defined on the inner wall of the axial spline sleeve 11 so that the axial spline nut 10 and the axial spline sleeve 11 only make an axial reciprocation.

When the axial spline sleeve 11 is driven to rotate by the actuator housing 12, the rectangular splines on the axial spline nut 10 are disconnected from the spline grooves on the inner side of the axial spline sleeve 11.

In case that the jam fault or the lag fault occurs between the axial spline nut 10 and the rotor lead screw 9, the bidirectional electromagnetic braking assembly is actively energized, and the actuator housing 12 drives the axial spline sleeve 11 to rotate by an angle, so as to forcibly disconnect the axial spline sleeve 11 with the axial spline nut 10 from an axial connection therebetween.

As shown in FIG. 4 and FIG. 5, a protruding square block is provided on the outer side of the axial spline nut 10 and reciprocates in a sliding groove of the actuator housing 12; and a protruding height of the protruding square block is greater than the protruding splines on the outer side of the axial spline nut 10.

A sector notch is defined on a side surface of the axial spline sleeve 11, which is configured to avoid a geometric interference with the protruding square block on the axial spline nut 10.

Preferably, the electromechanical actuator assembly according to the present disclosure further includes a linear displacement sensor, it is determined that the jam fault, the lag fault, or a looseness fault occurs in case that the linear displacement sensor of the electromechanical actuator assembly feeds back that a rotation of a ball screw pair is inconsistent with a linear displacement distance.

Figure 6:
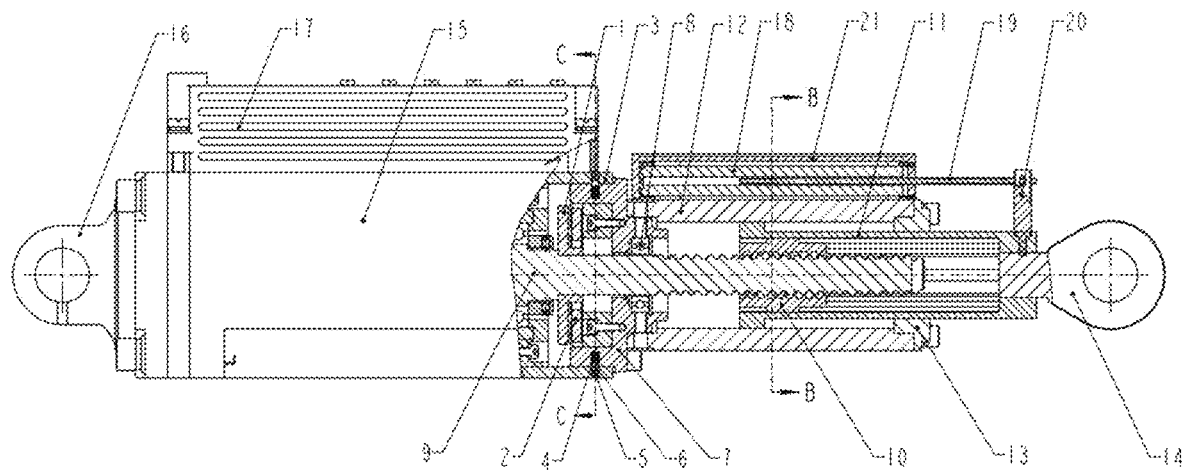
FIG. 6 is a structural view showing an internal composition of the electromechanical actuator for forcibly unlocking fuzzy jamming fault of the transmission mechanism according to a second embodiment of the present disclosure.
Figure 7:
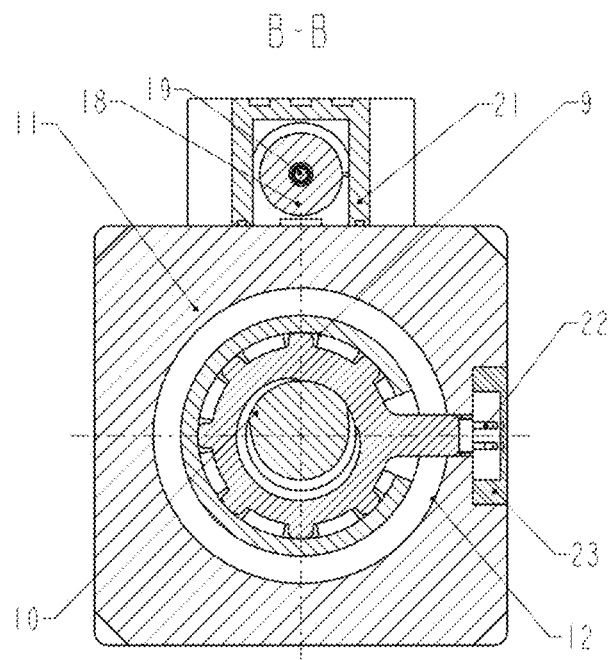
FIG. 7 is an internal cross-sectional view of the axial spline bearing assembly according to the second embodiment of the present disclosure.
Figure 8:
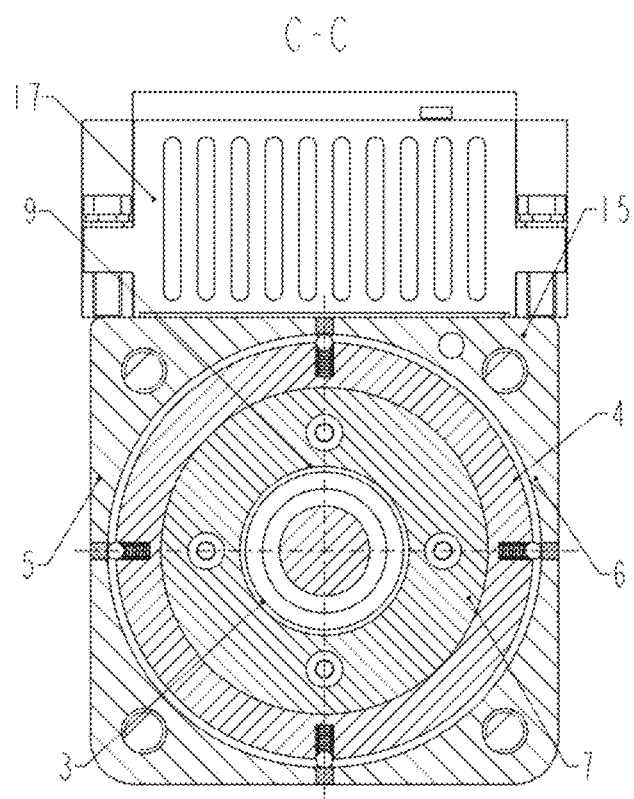
FIG. 8 is an internal cross-sectional view of a bidirectional electromagnetic braking assembly according to the second embodiment of the present disclosure.

As shown in FIG. 6, FIG. 7 and FIG. 8, the electromechanical actuator according to the present disclosure has another implementation form, based on the technical solution shown in FIGS. 1 to 3, the electromechanical actuator further includes an LVDT linear displacement sensor assembly, a potentiometer linear displacement sensor assembly and a control driver 17;

an absolute position of the axial spline nut 10 is detected by the potentiometer linear displacement sensor, and an absolute position of the axial spline sleeve 11 is detected by the LVDT linear displacement sensor assembly. In case that the two linear displacement sensors reach a switching position instantaneously, the control driver 17 sends a recovery control signal to the bidirectional electromagnetic braking assembly, and the bidirectional electromagnetic braking assembly is actively energized to generate the radial attraction force and the axial attraction force simultaneously, and then the servo motor 15 makes a rotary motion, so that the circumferential rotating housing assembly is fixedly connected with the electromechanical actuator assembly, which forcibly disconnect the axial spline sleeve 11 from the axial spline nut 10 at a corresponding annular groove, and thus the axial spline bearing assembly is connected to perform a linear reciprocation again, and a mechanical transmission function is recovered.

As shown in FIG. 6, FIG. 7 and FIG. 8, the LVDT linear displacement sensor assembly includes an LVDT stator 18, an LVDT telescopic rod 19, an LVDT bracket 20 and an LVDT housing 21; and the potentiometer linear displacement sensor includes a potentiometer spring brush 22 and a potentiometer resistance plate 23;

the LVDT linear displacement sensor assembly is mounted on an outer side of the actuator housing 12, the LVDT telescopic rod 19 is coaxial with the LVDT stator 18 and reciprocates in an inner cavity of the LVDT stator 18, the LVDT telescopic rod 19 and the LVDT bracket 20 are connected by screws, and the LVDT bracket 20 is fixedly connected to a front end of the axial spline sleeve 11; the LVDT stator 18 is mounted inside the LVDT housing 21, the LVDT housing 21 is connected to an outer surface of the actuator housing 12 by screws;

the potentiometer spring brush 22 is mounted at a protruding position of the axial spline nut 10 and is in contact with the potentiometer resistance plate 23 in a pre-compressed state; the potentiometer resistance plate 23 is mounted on the outer side of the actuator housing 12.

The working principle is as follows:

in case that a linear displacement sensor of the electromechanical actuator assembly feeds back that a rotation of a ball screw pair is inconsistent with a linear displacement distance, it is determined that the jam fault, the lag fault, a looseness fault occurs. Then, the bidirectional electromagnetic braking assembly is actively energized, and thus the electromagnetic coil stator axially attracts the floating magnetic stator 2 and the axial magnetic rotor 1, so that the floating magnetic stator 2, the axial magnetic rotor 1 and the rotor lead screw 9 are fixedly connected to form a whole; the electromagnetic coil stator radially attracts the magnetic steel ball 6, and the magnetic steel ball 6 compresses the spring 4 into the groove where the circumferential rotating bearing pedestal 7 is located, so that the circumferential rotating bearing pedestal 7 is disconnected with the housing of the servo motor 15 from the circumferential rotating connection therebetween; the actuator housing 12 drives the axial spline sleeve 11 to rotate by an angle, to forcibly disconnect the axial spline sleeve 11 with the axial spline nut 10 from an axial connection therebetween, forcibly deactivate the connection of the axial spline bearing assembly, and forcibly remove the jam fault or the lag fault between the rotor lead screw 9 and the transmission mechanism of the axial spline nut 10, so that the axial spline sleeve 11 and the front lug 14 are in a floating state.

In case that the lead accuracy and transmission efficiency of the transmission mechanism are comprehensively tested and meet the technical requirements, it is determined that the normal work can be resumed. The absolute position of the axial spline nut 10 is detected by the potentiometer linear displacement sensor, and the absolute position of the axial spline sleeve 11 is detected by the LVDT linear displacement sensor assembly, and in case that the two linear displacement sensors reach a switching position instantaneously, the recovery control signal is sent to the bidirectional electromagnetic braking assembly by the control driver 17, and the bidirectional electromagnetic braking assembly is actively energized to generate the radial attraction force and the axial attraction force simultaneously, and the servo motor 15 makes a rotary motion, so that the circumferential rotating housing assembly is fixedly connected with the electromechanical actuator assembly, to forcibly disconnect the axial spline sleeve 11 from the axial spline nut 10 at a corresponding annular groove, the axial spline bearing assembly is connected so as to perform a linear reciprocation again, and then a mechanical transmission function is recovered.

Embodiment

Specific data are given as examples to illustrate the advantages of the present disclosure.

In the electromechanical actuator for forcibly unlocking a fuzzy jamming fault of the transmission mechanism is provided according to the present disclosure, when a linear thrust of the actuator reaches 30 kN, a unlocking torque of the servo motor should not be less than 20 Nm, a diameter of the steel ball should not be less than 5 mm, an attraction force of the axial electromagnetic brake should not be less than 20 Nm, and an attraction of the radial electromagnetic brake should not be less than 5 Nm. According to the embodiment, forcibly unlocking is performed to achieve safety effect in case that the transmission mechanism occurs a fuzzy jam fault.

When the pushing load of the actuator is less than 30 kN, the steel ball is recovered from the unlocked position to the connection position by means of the torque capacity of 20 Nm of the servo motor and the capacity of 20 Nm of the axial electromagnetic brake. According to this implementation case, the mechanical transmission function can be recovered, which can provide a linear thrust of 30 kN again.

The content of the present disclosure not described in detail belong to the well-known technology of those skilled in the art.

The invention claimed is:

1. An electromechanical actuator for forcibly unlocking fuzzy jamming fault of a transmission mechanism, comprising a bidirectional electromagnetic braking assembly, a circumferential rotating housing assembly, an axial spline bearing assembly and an electromechanical actuator assembly;

the electromechanical actuator assembly, the bidirectional electromagnetic braking assembly, the circumferential rotating housing assembly and the axial spline bearing assembly are sequentially arranged on a same axis, the axial spline bearing assembly is mounted inside the circumferential rotating housing assembly so as to provide a linear reciprocation, and the axial spline bearing assembly is connected to a rotor lead screw of the electromechanical actuator assembly to form a screw transmission pair; the bidirectional electromagnetic braking assembly is actively energized to generate a radial attraction force and an axial attraction force simultaneously, so that the circumferential rotating housing assembly is disconnected with the electromechanical actuator assembly from a fixed connection therebetween and makes a rotary motion, to forcibly deactivate a connection between the axial spline bearing assembly and the electromechanical actuator assembly, and forcibly remove the fuzzy jamming fault or a lag fault between the rotor lead screw in the electromechanical actuator assembly and the transmission mechanism of the axial spline bearing assembly, wherein the bidirectional electromagnetic braking assembly comprises an axial magnetic rotor, a floating magnetic stator, an electromagnetic coil stator, a spring, a fixing screw and a magnetic steel ball;

the circumferential rotating housing assembly comprises: a circumferential rotating bearing pedestal and an actuator housing;

the axial spline bearing assembly comprises an axial spline nut and an axial spline sleeve;

the electromechanical actuator assembly comprises a lead screw supporting bearing, the rotor lead screw, a front end cover, a front lug, a servo motor and a rear lug;

the electromagnetic coil stator of the bidirectional electromagnetic braking assembly is fixed on the circumferential rotating bearing pedestal, and the axial magnetic rotor is fixed on the rotor lead screw;

when the bidirectional electromagnetic braking assembly is actively energized, the electromagnetic coil stator axially attracts the floating magnetic stator and the axial magnetic rotor, so that the floating magnetic stator, the axial magnetic rotor and the rotor lead screw are fixedly connected to form a whole; the electromagnetic coil stator radially attracts the magnetic steel ball, and the magnetic steel ball compresses the spring into a groove where the circumferential rotating bearing pedestal is located, so that the circumferential rotating bearing pedestal is disconnected with a housing of the servo motor from a circumferential rotating connection therebetween; the fixing screw limits the magnetic steel ball from being moved outward, and thus the spring is kept in a pre-compressed state;

the axial spline nut and the rotor lead screw are mounted on the same axis, the axial spline nut moves linearly through the screw transmission when the rotor lead screw rotates around the fixed axis; the circumferential rotating bearing pedestal supports the bearing of the rotor lead screw to rotate;

wherein protruding splines are provided at an outer circumference of the axial spline nut and are axially connected with spline grooves on an inner circumference of the axial spline sleeve; the axial spline sleeve and the front lug are threadedly connected to form a whole for being mounted with an external frame; the lead screw supporting bearing, the rotor lead screw, the actuator housing, the front end cover, the front lug, the servo motor and the rear lug are sequentially mounted on the same axis.

2. The electromechanical actuator for forcibly unlocking fuzzy jamming fault of the transmission mechanism according to claim 1, wherein a relative rotary motion between the circumferential rotating bearing pedestal and the rotor lead screw is achieved by the lead screw supporting bearing.

3. The electromechanical actuator for forcibly unlocking fuzzy jamming fault of the transmission mechanism according to claim 1, wherein the protruding splines provided at a middle section of the outer side surface of the axial spline nut are rectangular splines, a plurality of rectangular splines at the middle section of the outer side surface of the axial spline nut are meshed with the spline grooves defined on the inner wall of the axial spline sleeve in case that the axial spline nut is normally meshed with the rotor lead screw for transmission, so that the axial spline nut and the axial spline sleeve only make an axial reciprocation.

4. The electromechanical actuator for forcibly unlocking fuzzy jamming fault of the transmission mechanism according to claim 3, wherein the rectangular splines on the axial spline nut are disconnected from the spline grooves on the inner side of the axial spline sleeve in case that the axial spline sleeve is driven to rotate by the actuator housing.

5. The electromechanical actuator for forcibly unlocking fuzzy jamming fault of the transmission mechanism according to claim 4, wherein in case that the fuzzy jamming fault or the lag fault occurs between the axial spline nut and the rotor lead screw, the bidirectional electromagnetic braking assembly is actively energized, the actuator housing drives the axial spline sleeve to rotate by an angle, to forcibly disconnect the axial spline sleeve with the axial spline nut from an axial connection therebetween.

6. The electromechanical actuator for forcibly unlocking fuzzy jamming fault of the transmission mechanism according to claim 4, wherein a protruding square block is provided on the outer side of the axial spline nut and reciprocates in a sliding groove of the actuator housing; and a protruding height of the protruding square block is greater than the protruding splines on the outer side of the axial spline nut.

7. The electromechanical actuator for forcibly unlocking fuzzy jamming fault of the transmission mechanism according to claim 6, wherein a sector notch is defined on a side surface of the axial spline sleeve to avoid a geometric interference with the protruding square block on the axial spline nut.

8. The electromechanical actuator for forcibly unlocking fuzzy jamming fault of the transmission mechanism according to claim 4, further comprising an LVDT linear displacement sensor assembly, a potentiometer linear displacement sensor assembly and a control driver;

an absolute position of the axial spline nut is detected by the potentiometer linear displacement sensor, and an absolute position of the axial spline sleeve is detected by the LVDT linear displacement sensor assembly, the control driver sends a recovery control signal to the bidirectional electromagnetic braking assembly when the two linear displacement sensors reach a switching position instantaneously, the bidirectional electromagnetic braking assembly is actively energized to generate the radial attraction force and the axial attraction force simultaneously, and the servo motor makes a rotary motion, so that the circumferential rotating housing assembly is fixedly connected with the electromechanical actuator assembly, to forcibly disconnect the axial spline sleeve from the axial spline nut at a corresponding annular groove, and then the axial spline bearing assembly is connected to perform a linear reciprocation again, and a mechanical transmission function is recovered.

9. The electromechanical actuator for forcibly unlocking fuzzy jamming fault of the transmission mechanism according to claim 8, wherein the LVDT linear displacement sensor assembly comprises an LVDT stator, an LVDT telescopic rod, an LVDT bracket and an LVDT housing; the potentiometer linear displacement sensor comprises a potentiometer spring brush and a potentiometer resistance plate;

the LVDT linear displacement sensor assembly is mounted on an outer side of the actuator housing, the LVDT telescopic rod is coaxial with the LVDT stator and reciprocates in an inner cavity of the LVDT stator, the LVDT telescopic rod and the LVDT bracket are connected by screws, and the LVDT bracket is fixedly connected to a front end of the axial spline sleeve; the LVDT stator is mounted inside the LVDT housing, the LVDT housing is connected to an outer surface of the actuator housing by screws;

the potentiometer spring brush is mounted at a protruding position of the axial spline nut and is in contact with the potentiometer resistance plate to be in a pre-compressed state; the potentiometer resistance plate is mounted on the outer side of the actuator housing.

10. A mechanical fault self-recovery method realized by the electromechanical actuator for forcibly unlocking fuzzy jamming fault of the transmission mechanism according to claim 9, comprising the following steps:

step 1, collecting a position signal of the axial spline sleeve and a position signal of the axial spline nut by the LVDT linear displacement sensor assembly and the potentiometer linear displacement sensor assembly which operate simultaneously, pushing the two linear displacement sensors to be aligned to a fault contact position, with feedback values of the LVDT linear displacement sensor assembly and the potentiometer linear displacement sensor assembly being consistent within an error range;

step 2, attracting the magnetic steel ball radially by the electromagnetic coil stator, and compressing the spring into the grooved defined in the circumferential rotating bearing pedestal by the magnetic steel ball, so that the circumferential rotating bearing pedestal is disconnected with the housing of the servo motor from the circumferential rotating connection therebetween;

step 3, driving the axial spline sleeve to rotate by an angle by the actuator housing, to forcibly disconnect the axial spline sleeve from the axial spline nut at the corresponding annular groove, so that the axial spline bearing assembly is connected to perform the linear reciprocation again, and the mechanical transmission function is recovered.

11. A mechanical fault self-recovery method realized by the electromechanical actuator for forcibly unlocking fuzzy jamming fault of the transmission mechanism according to claim 8, comprising the following steps:

step 1, collecting a position signal of the axial spline sleeve and a position signal of the axial spline nut by the LVDT linear displacement sensor assembly and the potentiometer linear displacement sensor assembly which operate simultaneously, pushing the two linear displacement sensors to be aligned to a fault contact position, with feedback values of the LVDT linear displacement sensor assembly and the potentiometer linear displacement sensor assembly being consistent within an error range;

step 2, attracting the magnetic steel ball radially by the electromagnetic coil stator, and compressing the spring into the grooved defined in the circumferential rotating bearing pedestal by the magnetic steel ball, so that the circumferential rotating bearing pedestal is disconnected with the housing of the servo motor from the circumferential rotating connection therebetween;

step 3, driving the axial spline sleeve to rotate by an angle by the actuator housing, to forcibly disconnect the axial spline sleeve from the axial spline nut at the corresponding annular groove, so that the axial spline bearing assembly is connected to perform the linear reciprocation again, and the mechanical transmission function is recovered.

12. The electromechanical actuator for forcibly unlocking fuzzy jamming fault of the transmission mechanism according to claim 1, wherein the electromechanical actuator assembly further comprises a linear displacement sensor, it is determined that the fuzzy jamming fault, the lag fault, or a looseness fault occurs in case that the linear displacement sensor of the electromechanical actuator assembly feeds back that a rotation of the screw transmission pair is inconsistent with a linear displacement distance.

13. A method for forcibly unlocking fuzzy jamming fault of a transmission mechanism realized by the electromechanical actuator for forcibly unlocking fuzzy jamming fault of the transmission mechanism according to claim 1, comprising the following steps:

step 1, determining that the fuzzy jamming fault, the lag fault, or a looseness fault occurs when a linear displacement sensor of the electromechanical actuator assembly feeds back that a rotation of the screw transmission pair is inconsistent with a linear displacement distance;

step 2, attracting the floating magnetic stator and the axial magnetic rotor axially by the electromagnetic coil stator when the bidirectional electromagnetic braking assembly is actively energized, so that the floating magnetic stator, the axial magnetic rotor and the rotor lead screw are fixedly connected to form a whole;

step 3, attracting the magnetic steel ball radially by the electromagnetic coil stator, and compressing the spring into the grooved defined in the circumferential rotating bearing pedestal by the magnetic steel ball, so that the circumferential rotating bearing pedestal is disconnected with the housing of the servo motor from the circumferential rotating connection therebetween;

step 4, driving the axial spline sleeve to rotate by an angle by the actuator housing, to forcibly disconnect the axial spline sleeve with the axial spline nut from an axial connection therebetween, forcibly deactivate the connection of the axial spline bearing assembly, and forcibly remove the fuzzy jamming fault or the lag fault between the rotor lead screw and the transmission mechanism of the axial spline nut, so that the axial spline sleeve and the front lug are in a floating state.

\* \* \* \* \*